Patented Feb. 11, 1947

2,415,772

UNITED STATES PATENT OFFICE 2,415,772

PRODUCTION OF AMMONIUM SULFATE

Johannes Stephanus Antonius Joseph Maria van Aken, Lutterade, Netherlands, assignor to De Directie van de Staatsmijnen, Washington, D. C., a corporation of the Netherlands No Drawing. Application December 13, 1941, Serial No. 422,869. In the Netherlands June 9, 1937

11 Claims. (Cl. 23—119)

This invention relates to the production of ammonium sulfate, and more particularly to the production of ammonium sulfate by means of the saturation process involving the interaction of ammonia and sulfuric acid.

It is an object of this invention to produce a coarse-grained ammonium sulfate having improved characteristics in a simpler and more economical manner than has been possible in the past.

Other objects, and the manner in which the same are attained, will appear from the following description.

The well known saturation process of producing ammonium sulfate proceeds by interacting ammonia and sulfuric acid, and crystallizing ammonium sulfate from the saturation liquor thus obtained. The commercial sulfuric acid introduces into this process the usual metallic impurities such as iron, aluminium and chromium which tend to have a detrimental influence on the ammonium sulfate crystals ultimately obtained.

In the prior art the aforenoted drawback was not removed until one of my co-workers, G. Berkhoff, in his U. S. Patent 2,102,107, suggested to eliminate these impurities by the addition, to the saturation liquor, of a soluble phosphatic compound while simultaneously maintaining a content of free sulfuric acid in the saturation liquor below 1.5%.

As to the influence of arsenic, Berkhoff stated, that unless sufficient phosphoric acid or phosphates are present, the arsenic compounds react with iron to yield a brown flocculent precipitate or colloidal complex which is even more a hindrance for good crystallization of ammonium sulfate than are soluble iron compounds.

Contrary to all expectations however, I have discovered that the arsenic present in the sulfuric acid or the saturation liquor alone or with additional arsenic, may be utilized to eliminate these impurities provided several conditions are observed.

The basic concept of the present invention involves maintaining in the saturation liquor a content of free sulfuric acid not exceeding about 3%, maintaining in this liquor a content of pentavalent arsenic sufficient to precipitate the metallic impurities, precipitating these impurities to the point where their total content in the saturation liquor is at most 0.03% and preferably only at most 0.006%, crystallizing ammonium sulfate from this liquor and recovering the coarse-grained crystals thus produced.

According to the preferred embodiment of the invention all the impurities that are precipitated are precipitated in the form of arsenic compounds, the content of pentavalent arsenic in the saturation liquor being maintained sufficient to reduce the content of the metallic impurities remaining in solution to a maximum of about 0.03%, and preferably only at most 0.006%. Unless a special sort of sulfuric acid is employed in the process which has the required high content of arsenic, and more particularly of pentavalent arsenic, this must be supplied, either to the sulfuric acid or to the saturation liquor before the crystallization process may begin.

According to a modification of the invention, arsenic as well as phosphates or phosphoric acid are added; in that case the sum of the amounts of pentavalent arsenic and phosphatic compounds is maintained sufficient to precipitate the metallic impurities in the manner as outlined above.

Accordingly, the first condition that has to be met in my new process is the maintenance, in the saturation liquor, of a content of free sulfuric acid not exceeding about 3%. The process of interaction between sulfuric acid and ammonia must be so conducted, and the relative quantities of the reactants introduced into the saturator vessel must be so controlled that the amount of free acid present in the saturation liquor will always remain below about 3%.

The second condition that has to be observed in accordance with the invention involves the maintenance in the saturation liquor of a content of pentavalent arsenic sufficient to precipitate the impurities such as iron, aluminium and chromium, and effecting precipitation of these impurities to a point where their content in the saturation liquor is at most 0.03%, and preferably only at most 0.006%. According to the preferred embodiment of the invention where all the impurities that are precipitated are precipitated in the form of arsenic compounds, this condition evidently involves the maintenance, in the saturation liquor, of a content of pentavalent arsenic sufficient to precipitate impurities to a point where their content in the saturation liquor is at most 0.03%, and preferably only at most 0.006%. According to the aforenoted modification of the invention, this second condition involves the addition to the saturation liquor, of an amount of pentavalent arsenic and an amount of phosphoric acid or phosphates, together sufficient to precipitate the impurities to the point where their content in the saturation liquor is at most 0.03%, and preferably only at most 0.006%.

I have found that observance of the two conditions outlined above results in the precipitation, from the saturation liquor, of the metallic impurities in the form of arsenic compounds, notably ferric arsenate at times accompanied by other iron-arsenic compounds, and aluminium- and chromium-arsenate compounds, the precipitation eliminating the impurities from the solution to an extent sufficient for permitting the growth of exceedingly well-shaped large crystals of ammonium sulfate which are then recovered in the usual manner. It is important to note that the precipitate has no detrimental influence on the crystallization of the ammonium sulfate and that from a solution containing even a very material quantity of such precipitate exceedingly well-shaped large crystals may be recovered, with the result that there is no need for separating the precipitate from the saturation liquor, e. g. by centrifuging or in any other manner.

The necessary amount of arsenic, and more especially pentavalent arsenic, may either be present in the sulfuric acid employed in the process or it may be added to the sulfuric acid prior to the introduction thereof into the process, or else it may be added to the saturation liquor. When once the content of the metallic impurities in the saturation liquor is sufficiently low, this favorable circumstance is maintained if only in the sulfuric acid to be added in the course of the process, pentavalent arsenic is in slight excess with respect to the metallic impurities. Preferably a sulfuric acid is prepared which contains at least 1 gram atom of pentavalent arsenic to 1 gram atom of iron, chromium or aluminium. Commercial sulfuric acid often contains too little arsenic to meet this condition. In this case the necessary amount of pentavalent arsenic has to be added. It is also possible to employ a specially produced sulfuric acid having the desired high content of arsenic.

In case the sulfuric acid or the saturation liquor contains a sufficient quantity of arsenic compounds, however, too little of these in the pentavalent form, it is necessary to convert part or all of the trivalent arsenic into pentavalent arsenic, the amount to be converted depending to a certain extent on the form of the crystals which is to be ultimately obtained. This conversion may be effected e. g. with the aid of nitric acid, according to Mellor's Comprehensive Treatise etc. Vol. 9, page 105.

The fact that the critical percentage of free acidity is in the neighborhood of 3% is shown by the following observations. With an almost constant arsenic content of about 2.1%, the content of iron in solution in the saturation liquor varies in proportion to the free acid as follows:

| Per cent free acid | 7.7 | 6.5 | 5.1 | 4.5 | 3.5 | 2.3 | 1.2 | 0.9 |
|---|---|---|---|---|---|---|---|---|
| Per cent iron | 0.153 | 0.118 | 0.09 | 0.09 | 0.10 | 0.028 | 0.006 | 0.005 |

The schedule clearly shows that there is a critical point in the neighborhood of about 3% of free acid. About this degree of acidity the gradual decrease of the iron content becomes suddenly very steep. In correspondence with this sudden decrease a noticeable improvement in the ammonium sulfate according to the sieve analysis is observed.

Reduction of the iron content to allowable values at degrees of acidity higher than 3% would involve the addition of very large amounts of pentavalent arsenic. At 3.5% of free acid and 2.1% of pentavalent arsenic the iron content is still more than 3 times too high. To reduce the iron content in this case to 0.03% at a constant degree of acidity of 3.5% it would be necessary to raise the content of pentavalent arsenic to about 7%. So high a content of pentavalent arsenic however is in itself undesirable.

In order to show that if the above two conditions with respect to free acidity and content of metallic impurities are not fulfilled an entirely inferior product results, I have tested the saturation process for the following conditions:

A saturation liquor was prepared containing 0.23% of pentavalent arsenic, 0.18% of iron and 6.5% of free sulfuric acid. The resulting product was an ammonium sulfate consisting, according to the sieve analysis, of crystals of which 1% was larger than 2 mms., 40.5% between 2 and 0.5 mms., 44.5% between 0.5 and 0.2 mms. and 14% smaller than 0.2 mm. The decided inferiority of this product is apparent from a comparison with the following examples according to the present invention.

*Example 1*

By mixing sulfuric acid and ammonia a saturation liquor containing 0.6% free sulfuric acid was prepared. The sulfuric acid used contained 0.015% of pentavalent arsenic and 0.020% of iron. Though this iron content is pretty low it was to be expected that in the course of the process the iron content of the saturation liquor would soon rise. Therefore ammonium arsenate was added until the iron content of the liquor had dropped to 0.003%. The content of pentavalent arsenic by this time had risen to 0.19%. After this preparation of the saturation liquor the ammonium sulfate contained according to the sieve analysis, 3.0% of crystals larger than 2 mms., 90.0% between 2 and 0.5 mms., 4.5% between 0.5 and 0.2 mm., and 2.5% smaller than 0.2 mm.

The favorable circumstances were maintained by using in the course of the process a sulfuric acid containing 0.045% of pentavalent arsenic and 0.020 of iron.

A comparison of this product with the product obtained when working at a free acidity of 6.5% and 0.18% of iron illustrates the importance of the reduction of both percentages, which reduction results in yielding more than twice the amount of crystals in the fraction larger than 0.5 mm. It is noted in this connection that the sulfuric acid used according to this example had the same iron content as the one employed in the test in which an inferior product was obtained.

*Example 2*

A mother liquor was prepared which contained 3.9% of pentavalent arsenic, 0.03% of iron and 2.8% of free sulfuric acid. The resulting product were ammonium sulfate crystals 91% of which were between 2 and 0.5 mms.

It is noted that the iron content of 0.03% is about the critical limit permissible for the content in impurities of the saturation liquor. The content of free sulfuric acid too is near the critical upper limit.

*Example 3*

A mother liquor was prepared which contained 0.1% of pentavalent arsenic, 0.006% of iron and 0.6% of free sulfuric acid. The resulting ammonium sulfate crystals were analyzed as follows: 3.5% were larger than 2 mms., 89.5% were between 2 and 0.5 mms., 6.0% were between 0.5 and 0.2 mms. and 1.0% was smaller than 0.2 mm.

It is noted that while the content in the saturation liquor of pentavalent arsenic, in accordance with this invention, is limited solely to an amount sufficient to precipitate the impurities, to the point where their content in the saturation liquor is at most 0.03%, preferably at least an amount of 0.1% of pentavalent arsenic as stated in this example should be present in the saturation liquor.

According to the aforenoted modification of the invention, a fraction of the impurities present in the saturation liquor may be precipitated by means of a soluble phosphatic compound, the rest of the impurities that are precipitated, however, being again precipitated in the form of arsenic compounds. These conditions are illustrated by the following example.

*Example 4*

Crystallization was effected in a saturation liquor which contained 0.6% free sulfuric acid, 0.25% of pentavalent arsenic, 0.185% of $P_2O_5$ and 0.002% of trivalent iron. This saturation liquor was obtained by adding phosphoric acid and ammonium arsenate to the contents of the saturator. The sulfuric acid used contained 0.032% of pentavalent arsenic and 0.039% of trivalent iron. In the course of the process the favorable circumstances were maintained by adding extra phosphoric acid to the saturation liquor. To this end with 75 tons of sulfuric acid 72 liters of a 60% phosphoric acid were added. The resulting crystals analyzed 0.5% larger than 2 mms., 89.0% between 2 and 0.5 mms., 8% between 0.5 and 0.2 mm. and 2.5% smaller than 0.2 mm.

Thus with 0.6% of free sulfuric acid, arsenic and phosphoric acid together were able to precipitate the iron brought in by the sulfuric acid, until not more than 0.002% of iron remained in the saturation liquor.

It is also possible to start with the saturation liquor prepared according to the process described in the aforenoted Patent No. 2,102,107 and to add pentavalent arsenic in the course of the process.

When starting with a saturation liquor containing 0.23% of pentavalent arsenic, 0.18% of iron and 6.5% of free sulfuric acid, which liquor was referred to one page 4 of this specification as not yielding an ammonium sulfate having the desired crystallized form, this liquor may be converted into a starting liquor of the desired composition by lowering its content in free sulfuric acid by the addition of ammonia followed by the addition of an arsenic compound. When the acidity is reduced there is precipicated an iron arsenic compound in colloidal form resulting in a slimy ammonium sulfate product of very undesirable crystalline form, part of which is removed with the ammonium sulfate.

In order to obtain the desired low content of iron a further quantity of arsenic is added to the solution. In this example to 25 cms. of saturation liquor 80 kgs. of pentavalent arsenic are added at a content of free sulfuric acid of 0.5%. It is to be noted that the saturation liquor frequently does not obtain the desired composition before the lapse of some days (e. g. four or five days) inasmuch as the slimy nature of the content of the saturator vessel tends to impede any progress toward the desired composition of the saturation liquor. The fact that in this way at first a slimy ammonium sulfate-product of objectionable crystalline form is obtained, accounts for the reason why a low acidity as presently disclosed has never been practiced in the prior art with the exception of Patent No. 2,102,107.

Various changes may be made in the details disclosed in the foregoing specification without departing from the invention or sacrificing the advantages thereof.

I claim:

1. In the preparation, by the saturation process, of coarse-grained ammonium sulfate from a saturation liquor prepared from sulfuric acid containing compounds of metals of the group composed of iron, aluminium and chromium as impurities, the method which comprises maintaining in the saturation liquor a content of free sulfuric acid not exceeding about 3%, adding to said liquor an arsenic compound in an amount such that together with the arsenic introduced by the sulfuric acid, there is maintained in said liquor a content of pentavalent arsenic sufficient to precipitate said impurities to the point where their content in the saturation liquor is at most 0.03%, crystallizing ammonium sulfate from said liquor and recovering the coarse-grained crystals thus produced.

2. In the preparation, by the saturation process, of coarse-grained ammonium sulfate from a saturation liquor prepared from sulfuric acid containing compounds of metals of the group composed of iron, aluminium and chromium as impurities, the method which comprises maintaining in the saturation liquor a content of free sulfuric acid not exceeding about 3%, adding to said sulfuric acid an arsenic compound in an amount such that when added to the amount of arsenic originally contained in the sulfuric acid, there will be maintained in the saturation liquor a content of pentavalent arsenic sufficient to precipitate said impurities to the point where their content in the saturation liquor is at most 0.03%, crystallizing ammonium sulfate from said liquor and recovering the coarse-grained crystals thus produced.

3. In the preparation, by the saturation process, of coarse-grained ammonium sulfate from a saturation liquor prepared from sulfuric acid containing compounds of metals of the group composed of iron, aluminium and chromium as impurities, the method which comprises maintaining in the saturation liquor a content of free sulfuric acid not exceeding about 3%, adding pentavalent arsenic in an amount sufficient to precipitate at least a fraction of said impurities, adding a soluble phosphatic compound in an amount sufficient to precipitate another part of said impurities, precipitating said impurities to the point where their content in the saturation liquor is at most 0.03%, crystallizing ammonium sulfate from said liquor and recovering the coarse-grained crystals thus produced.

4. The process according to claim 1, wherein instead of pentavalent arsenic a compound of pentavalent arsenic is added.

5. The process according to claim 1, wherein ammonium arsenate is added.

6. The process according to claim 3, wherein the soluble phosphatic compound is added to the sulfuric acid.

7. The process according to claim 3, wherein the soluble phosphatic compound is added to the saturation liquor.

8. The process according to claim 3, wherein the soluble phosphatic compound is phosphoric acid.

9. The process according to claim 3, wherein the soluble phosphatic compound is a phosphate.

10. The process according to claim 1, including the step of starting the process by mixing sulfuric acid, water, ammonia and pentavalent arsenic, to produce a saturation liquor containing an amount of pentavalent arsenic sufficient to cause the impurities introduced with the sulfuric acid to be precipitated.

11. The process according to claim 1, including the step of starting the process by mixing sulfuric acid, water, ammonia, pentavalent arsenic and phosphoric acid to produce a saturation liquor containing an amount of pentavalent arsenic and phosphoric acid sufficient to cause the impurities introduced with the sulfuric acid to be precipitated.

JOHANNES STEPHANUS ANTONIUS
JOSEPH MARIA van AKEN.

REFERENCES CITED

The following references are of record in the file of this patent:

UNITED STATES PATENTS

| Number | Name | Date |
|---|---|---|
| 2,102,107 | Berkhoff | Dec. 14, 1937 |
| 1,919,707 | Adam | July 25, 1933 |
| 1,999,257 | Reynhart | Apr. 30, 1935 |
| 2,022,313 | Ruys | Dec. 3, 1935 |

FOREIGN PATENTS

| Number | Country | Date |
|---|---|---|
| 612,744 | German | May 3, 1935 |
| 598,773 | German | June 18, 1934 |
| 419,844 | British | Nov. 20, 1934 |
| 484,921 | British | May 11, 1938 |

OTHER REFERENCES

Lunge and Cumming, Mfg. of Acids and Alkalies, vol. 11, p. 337 (Copy in Div. 59.)